UNITED STATES PATENT OFFICE.

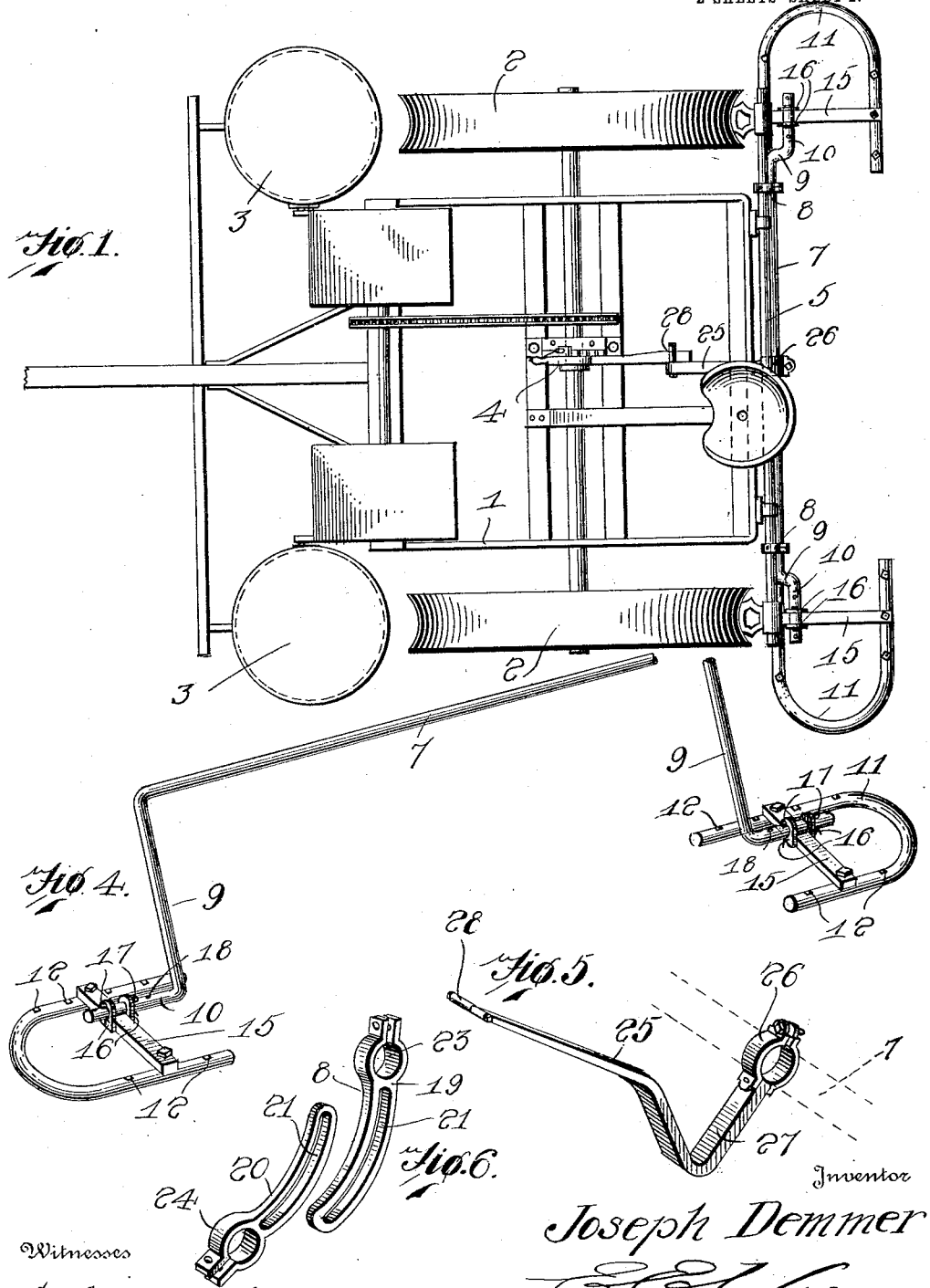

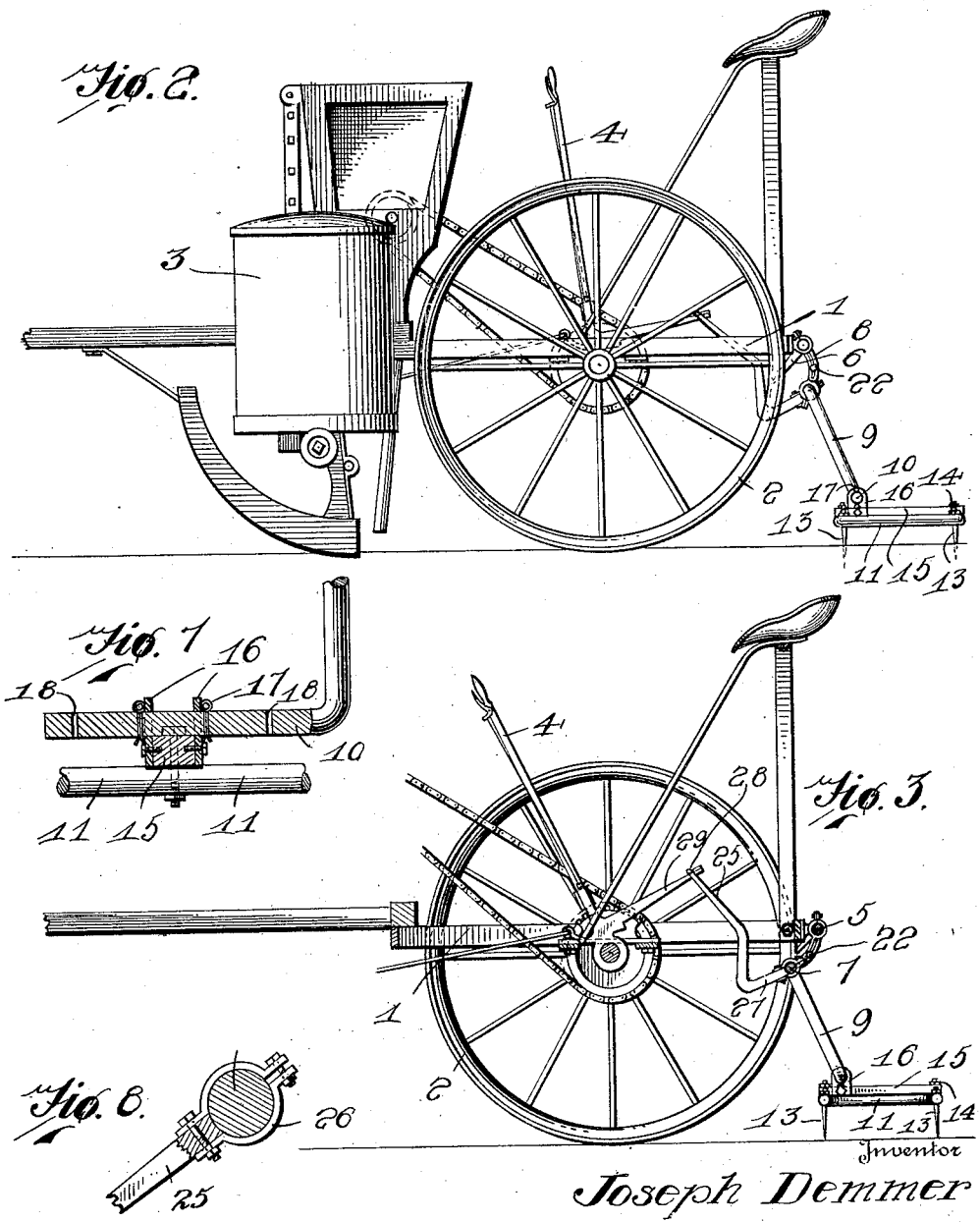

JOSEPH DEMMER, OF DYERSVILLE, IOWA.

CORN-PLANTER HARROW ATTACHMENT.

1,120,912.  Specification of Letters Patent.  Patented Dec. 15, 1914.

Application filed January 10, 1914. Serial No. 811,422.

*To all whom it may concern:*

Be it known that I, JOSEPH DEMMER, a citizen of the United States of America, residing at Dyersville, in the county of Dubuque and State of Iowa, have invented certain new and useful Improvements in Corn-Planter Harrow Attachments, of which the following is a specification, reference being had therein to the accompanying drawing.

This invention relates to corn planter harrow attachments and has for its object the production of a simple and efficient harrow adapted to be used in connection with corn planters so as to cover up the stray grains of corn or the like which have been pressed down into the ground and are not sufficiently covered.

A further object of the invention is the production of a simple and efficient means for supporting the harrows in the rear of the corn planter frame so as to allow the same to have a free and slidable motion in order to follow the level of the ground, and in this way efficiently cut open the entire surface of the ground and not merely open the higher points of the surface of the ground over which the device is traveling.

With these and other objects in view this invention consists of certain novel combinations, constructions, and arrangements of parts as will be hereinafter fully described and claimed.

In the accompanying drawings:—Figure 1 is a top plan view of the device applied to the frame of the corn planter. Fig. 2 is a side elevation of the device illustrated in Fig. 1. Fig. 3 is a central longitudinal section through the corn planter showing the planter boxes and planting mechanism removed therefrom. Fig. 4 is a detail perspective of the harrow carrying bar. Fig. 5 is a detail perspective of the lift lever. Fig. 6 is a detail perspective of the supporting links for connecting the harrow supporting bar in engagement with the planter frame. Fig. 7 is a longitudinal section through one end of the harrow supporting bar showing the manner of connecting the harrow thereto. Fig. 8 is a transverse sectional view through the harrow supporting bar showing the manner in which the lift is connected thereto.

By referring to the drawings it will be seen that 1 designates the frame which is of the usual construction and is supported upon the usual wheels 2. The frame 1 carries the usual planting mechanism 3 which is operated by means of the operating lever 4 as is usual with the ordinary corn planters. A supporting shaft 5 is carried by the rear end of the frame 1 and this supporting shaft carries the scraper shoes 6 for scraping the rims of the wheels 2 in the usual manner.

A harrow supporting bar 7 is suspended below the supporting shaft 5 by means of the adjustable links 8 as hereinafter described. This harrow supporting bar 7 is provided with a pair of downwardly extending arms 9, which arms terminate in laterally extending fingers 10. A substantially U-shaped harrow tooth supporting frame 11 is carried by each of the fingers 10 and the frame 11 is provided with a plurality of apertures 12 for receiving the harrow teeth 13 which are secured thereto in any suitable manner such as for instance by means of the nuts 14 as is illustrated in Fig. 2. The substantially U-shaped harrow tooth supporting frame carries a transversely extending bar 15 which is connected thereto, and this bar 15 is provided with a plurality of spaced upwardly extending ears 16, which ears are provided with apertures for receiving the fingers 10 of the bar 7. Cotter pin 17 pass through the apertures 18 formed in the fingers 10 and fit upon the opposite sides of the ears 16 so as to firmly hold the substantially U-shaped harrow tooth supporting frame 11 in a set or adjustable position upon the fingers 10. It should be understood that the fingers 10 are provided with a plurality of these apertures 18 so as to allow the harrow tooth supporting frame 11 to be adjusted at different positions upon the harrow supporting bar 7.

The harrow supporting bar 7, as above stated, is suspended below the supporting shaft 5 by means of the links 8, and these links comprise a primary section 19 and an auxiliary section 20, which sections are similarly constructed and are provided with slotted body portions 21 for the purpose of receiving a securing or locking bolt 22 in order that the sections may be held in an assembled position. The primary section 19 is provided with a split collar portion 23 for firmly clamping around the shaft 5, whereas the auxiliary portion 20 is provided with a split collar portion 24 for fitting tightly around the harrow supporting bar 7. It will, therefore, be seen that the harrow supporting bar 7 will be efficiently suspended below the supporting shaft 5 and may be swung upon the frame when it is so desired by means of the lift lever 25. The lift lever 25 is provided with a pivoted split collar portion 26 which fits snugly around the harrow supporting bar 7 as is illustrated in Figs. 2, 3 and 5. The lift lever 25 is provided with a substantially V-shaped lower end 27 which terminates in an upwardly extending finger having a laterally extending foot engaging portion 28 at its upper end. The laterally extending foot engaging portion 28 is adapted to fit upon the rearwardly extending finger 29 of the operating lever 4 so as to raise the lift 25 as the lever 4 is pushed forwardly to the position shown in Fig. 3, thereby slightly lifting the harrow tooth supporting member 11, and drawing the teeth out of engagement with the ground. When the lever 4 is in its normal position the teeth 13 will assume the position shown in full lines in Fig. 2. It, of course, should be understood that the sections 19 and 20 may be adjusted so as to regulate the depth at which the teeth 13 will enter the ground.

If the harrow tooth supporting bodies 11 should strike an obstruction it should be understood that the same may readily yield owing to the fact that the lift is not rigidly connected to the rearwardly extending finger 29 of the lever 4, and will, therefore, have a yieldable engagement with the ground so as to accommodate itself to the unevenness of the ground over which the device is traveling. If, however, it is desired to lift the mechanism the lever 4 may be thrown so as to simultaneously lift the harrow bodies.

It should be understood that the laterally extending foot engaging portion 28 may be engaged by the foot of the operator of the machine in order to throw the harrows in firm engagement with the surface of the ground over which the machine may be traveling.

By carefully considering the drawings it will be seen that owing to the fact that the lift lever 25 is not permanently attached to the finger 29, the tooth supporting members may have a yieldable downward movement so as to lie snugly upon or follow the undulations of the ground over which the machine may be passing.

Having thus described the invention what is claimed, as new, is:—

A device of the class described comprising a frame, a supporting shaft, a harrow tooth supporting bar, adjustable links secured to said shaft and supporting bar for regulating the distance between said supporting bar and said shaft, harrow tooth supporting frames carried by said bar, said frames being pivotally supported upon said bar and capable of having swinging movement, an operating lever provided with a projecting finger, a trip lever provided with laterally extending fingers, the fingers of said trip lever engaging the projecting finger of said operating lever for regulating the upward movement of said harrow tooth supporting members relative to said frame.

In testimony whereof I hereunto affix my signature in presence of two witnesses.

JOSEPH DEMMER.

Witnesses:
JOHN A. SCHNIEDERS,
J. H. PRIER.

Copies of this patent may be obtained for five cents each, by addressing the "Commissioner of Patents, Washington, D. C."